United States Patent [19]
Ponziani

[11] Patent Number: 6,015,276
[45] Date of Patent: Jan. 18, 2000

[54] SYSTEM AND METHOD FOR REDUCING VIBRATION IN A WINDSHIELD WASHER PUMP

[75] Inventor: Richard L. Ponziani, Centerville, Ohio

[73] Assignee: Valeo, Inc., Auburn Hills, Mich.

[21] Appl. No.: 08/768,995

[22] Filed: Dec. 18, 1996

[51] Int. Cl.[7] .................................................. F04B 35/04
[52] U.S. Cl. .............................. 417/423.14; 417/423.12; 416/179
[58] Field of Search ........................... 416/179; 137/102; 417/442, 423.15, 424.1, 423.12, 390, 923.14; 415/180, 116, 144

[56] References Cited

U.S. PATENT DOCUMENTS

| | | | |
|---|---|---|---|
| 5,181,838 | 1/1993 | Sato et al. | 417/360 |
| 5,713,730 | 2/1998 | Nose et al. | 417/423.14 |

FOREIGN PATENT DOCUMENTS

| | | |
|---|---|---|
| 0683323 | 11/1995 | European Pat. Off. . |
| 2245009 | 4/1974 | Germany . |
| 2445646 | 4/1976 | Germany . |
| 920961 | 4/1988 | United Kingdom . |
| 9403731 | 2/1994 | WIPO . |
| WO 94/03731 | 2/1994 | WIPO .............................. F04D 29/22 |

Primary Examiner—Charles G. Freay
Attorney, Agent, or Firm—J. Gordon Lewis

[57] ABSTRACT

This invention includes a system and method for maintaining an impeller in a centrally located position in a pump cavity defined by an impeller housing in order to reduce noise and vibration between the impeller and the impeller housing. The system and method include situating an end or tip of the impeller in a bearing which is integrally molded onto the impeller housing at an inlet end thereof. Another embodiment illustrates the use of a locator integrally molded at the inlet end of the impeller housing and which cooperates with a locating aperture in an impeller end of the impeller to cause the impeller end to be maintained in a substantially centrally located position in the pump cavity defined by the impeller housing.

19 Claims, 2 Drawing Sheets

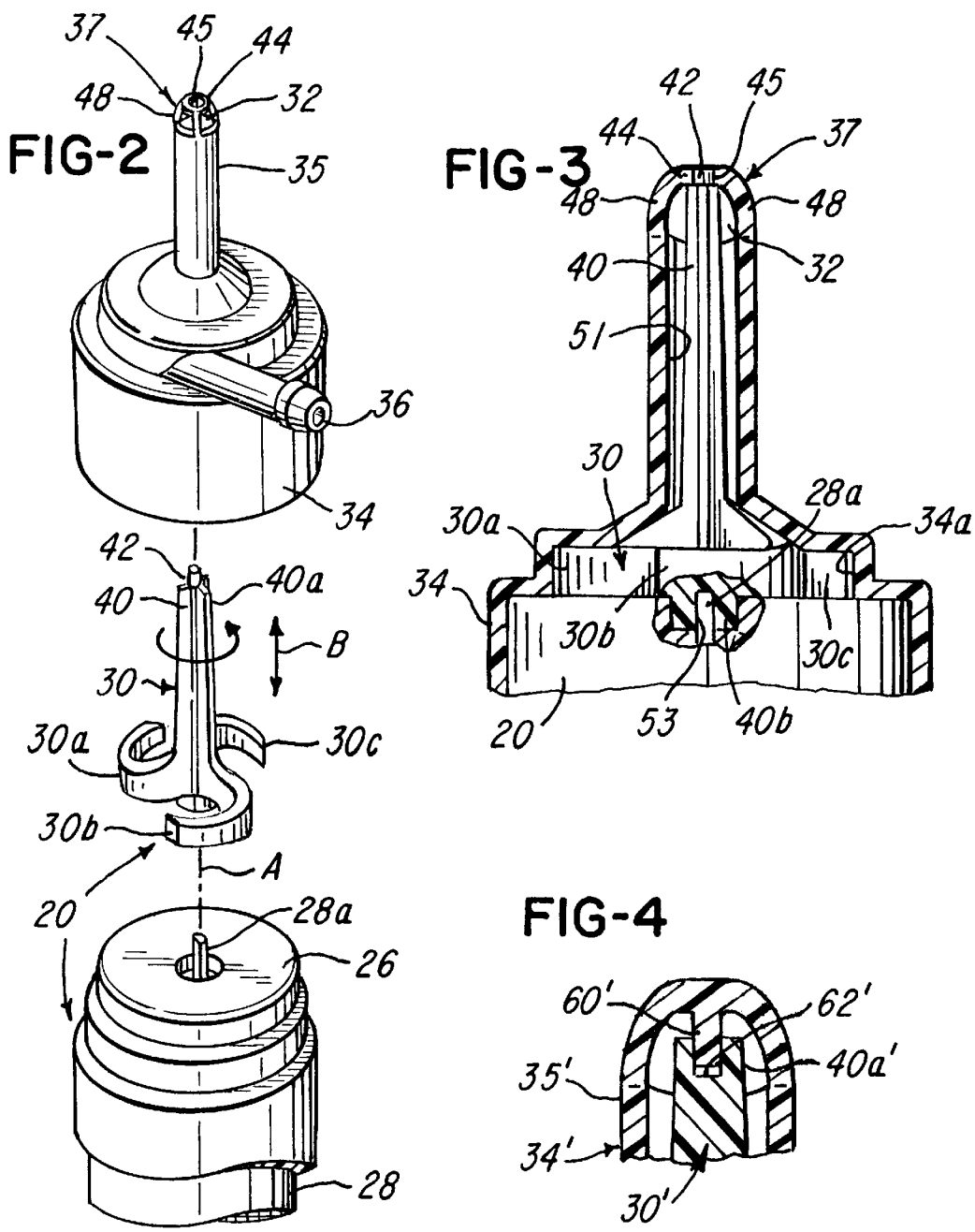

SYSTEM AND METHOD FOR REDUCING VIBRATION IN A WINDSHIELD WASHER PUMP

BACKGROUND OF THE INVENTION

1. Field of the Invention

This invention relates to windshield washer pumps used in vehicles, and more particularly, to a windshield washer impeller and impeller housing which cooperate to reduce or eliminate vibration in the washer pump.

2. Description of the Related Art

In the field of vehicle washer pumps that are centrifugal in their design, a rigid impeller is situated inside a pump cavity that creates a pressure from a pump inlet to a pump outlet in order to pump a windshield washer fluid therebetween. The impeller is typically driven by a washer motor to create the pumping action.

It was not uncommon that the impellers had an elongated nose or end that extended into an inlet area of the pump cavity in order to "prime" the pump with a minimum amount of washer fluid in the event a reservoir of washing fluid was pumped until it was empty and then re-filled which caused air pocket to be created in the pump cavity. The elongated nose or end of the impeller caused washer fluid in the re-filled reservoir to become agitated, thereby displacing the air pocket in the pump cavity. The air pocket in the pump cavity would often cause noise and vibration which may, in turn, damage the parts of the pump.

Unfortunately, one of the problems with using an impeller having an elongated end was that the impeller had a tendency to "walk" or "track" an inner surface of the impeller housing. This, in turn, resulted in noise and vibration and, sometimes, even damaged components of the pump.

What is needed, therefore, is a simplistic and relatively inexpensive system and method to reduce or eliminate this noise and vibration and to provide an improved pump design.

SUMMARY OF THE INVENTION

It is, therefore, a primary object of the invention to provide an improved pump design wherein an elongated portion of an impeller is supported at its end in order to reduce or eliminate noise and vibration when the impeller is rotatably and/or axially driven.

Another object of the invention is to provide a integrally molded one-piece construction impeller housing which defines a pump cavity which receives an impeller in a manner that supports the impeller such that the impeller maintains a predetermined alignment in the pump cavity.

Still another object of the invention is to provide a system and method for maintaining an impeller in a desired alignment position in a pump cavity which is simple in design and easy to implement.

In one aspect, this invention comprises a washer pump for use in a window washing system comprising a pump motor, an impeller coupled to an armature of the pump motor, a pump motor housing for receiving the pump motor, an impeller housing defining a pump cavity for receiving the impeller and for coupling to the pump motor housing and the impeller housing and the impeller cooperating the impeller to be maintained in a substantially centrally-located position in the pump cavity.

In another aspect, this invention comprises a windshield washing system for washing a window on a vehicle comprising a reservoir for storing washer fluid and a washer pump for pumping washer fluid from the reservoir to the windshield which a washer switch is actuated to initiate a wash cycle, the washer pump for use with in a window washing system comprising a pump motor, an impeller coupled to an armature of the pump motor a pump motor housing for receiving the pump motor, an impeller housing defining a pump cavity for receiving the impeller and for coupling to the pump motor housing, the impeller housing and the impeller cooperating the impeller to be maintained in a substantially centrally-located position in the pump cavity.

In still another aspect, this invention comprises a method for reducing vibration of an impeller in an impeller housing of a windshield washer fluid pump comprising an impeller housing defining a pump cavity for receiving the impeller, the method comprising the steps of situating the impeller in the pump cavity, centrally locating the impeller in the pump cavity defined by the impeller housing such that a portion of the impeller is maintained in a predetermined position in the pump cavity so that the portion of the impeller does not vibrate when the impeller is either axially or rotatably driven, driving the impeller in the pump cavity to pump washer fluid from a reservoir to a windshield.

Other objects and advantages of the invention will be apparent from the following description, the accompanying drawings, and the appended claims.

BRIEF DESCRIPTION OF THE ACCOMPANYING DRAWINGS

FIG. 2 is an exploded view of a pump comprising a motor, impeller and impeller housing in accordance with one embodiment of the invention;

FIG. 3 is a sectional view showing details of an impeller situated in an impeller housing;

FIG. 4 is a fragmentary view of a tip of the impeller shown in FIG. 3; and

DETAILED DESCRIPTION OF THE PREFERRED EMBODIMENT(S)

Figure 1:
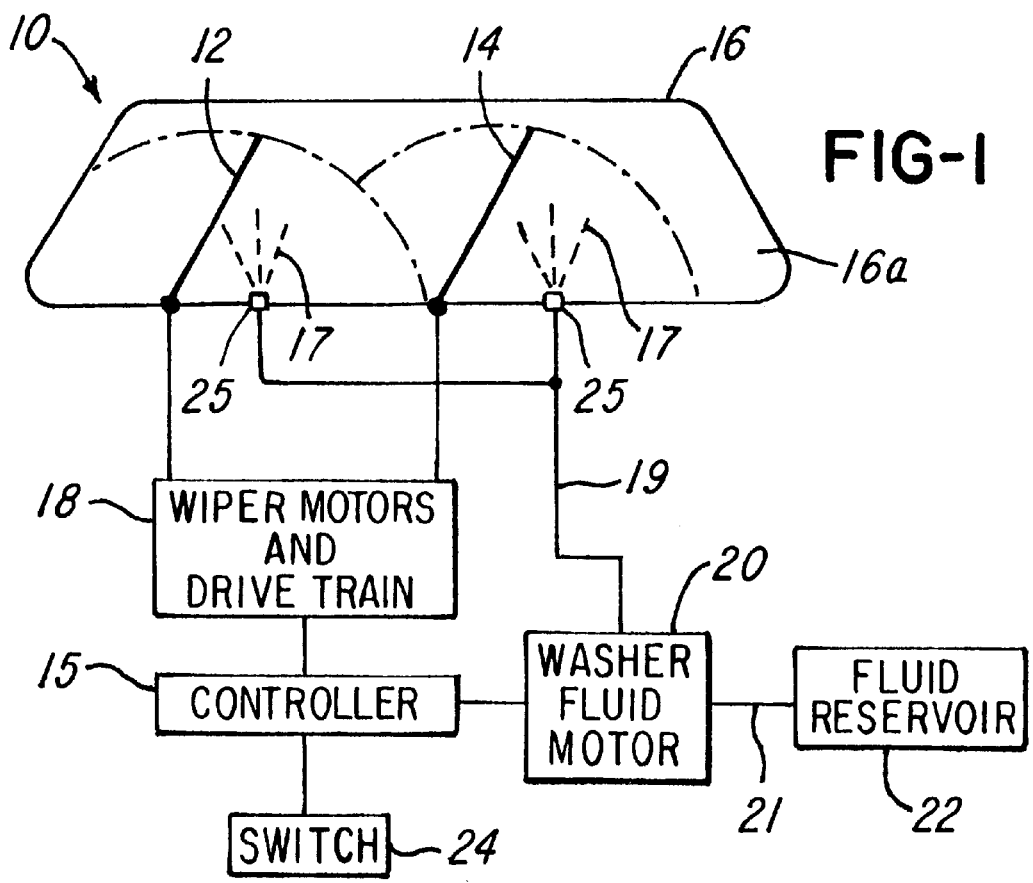
FIG. 1 is an illustration of a windshield wiper system incorporating features of the present invention.

Referring now to FIG. 1, a windshield wiper system 10 for use on a vehicle (not shown) is shown comprising features of the present invention. The windshield wiper system 10 comprises at least one wiper blade, such as blades 12 and 14, for wiping a window or windshield 16 on the vehicle.

The windshield wiper system 10 further comprises a controller coupled to a wiper drive and drive train, drive means or drive 18 for driving the wiper blades 12 and 14 in order to wipe a surface 16a of the windshield 16 free of debris, such as water, dirt, leaves, snow and the like.

The windshield wiper system 10 further comprises a windshield wiper washer motor or pump 20 for pumping washer fluid 17 from a reservoir 22 to the windshield 16 through suitable tubing 19.

The windshield wiper system 10 further comprises aa wash switch 24 coupled to controller 15 which may be actuated by an operator to cause the wiper drive 18 to drive the wiper blades 12 and 14. The switch 24 comprises a wash setting (not shown) which a user may activate to initiate the windshield wash cycle. When wiper switch 24 is actuated to the wash cycle setting, washer pump 20 is energized to pump washer fluid (not shown) from the reservoir 22 to the windshield 16, while wiper blades 12 and 14 are driven by wiper drive 18 in order to wipe and wash the windshield 16.

As best illustrated in FIG. 2, the washer motor comprises an electrical motor, such as Model No. 22110115 distributed by the Assignee of the present invention. As best illustrated in FIG. 2, the washer motor 20 comprises a motor housing 26 which encases the electrical motor 28 which is coupled to a power source (not shown), such as a battery (not shown) or an alternator (not shown) of the vehicle.

The electrical motor 28 drives an armature 28a which, in turn, is coupled to an impeller 30 such that when the electrical motor 28 is energized, the impeller 30 is rotatably driven about an axis A (FIG. 2) of the armature 28a such that washer fluid 17 (FIG. 1) is pumped from an inlet 32 through an impeller housing 34 to an outlet 36. It should be appreciated that the inlet 32 may be either situated in reservoir 22 such that inlet 32 engages fluid 17 or coupled to the reservoir 22 via suitable means such as elastomeric or rubber tubing 21 (FIG. 1). Also, the outlet 36 is coupled to a plurality of washer nozzles 25 via similar tubing 19 such that the washer fluid 17 is transferred by pump 20 from the reservoir 22 through the nozzles 25 and onto a surface 16a of windshield 16.

Notice that the impeller 30 comprises a plurality of blades 30a, 30b and 30c which comprise a spiral shape as shown. Notice also that the impeller 30 comprises an impeller tip which axially extends along the axis A of armature 28. Note that the impeller housing 34 comprises an end 35 having an impeller nest 37 integrally molded thereto and comprising a bearing 44 coupled to end 35 via a plurality of integrally molded legs 48.

The impeller 30 comprises an elongated portion 40 comprising a tip 42 which is received in an aperture 45 (FIG. 3) defined by bearing 44 which is integrally molded and coupled to impeller housing 34 via the plurality of integrally molded legs 48. Note that the bearing 44 is supportably molded in a substantially centered position such that it is centered about the axis A of the elongated portion 40, as well as the axis of armature 28a.

The impeller 30 has a tip 42 which is received in aperture 44 of bearing 44 and cooperates therewith to facilitate centrally locating and maintaining the position of elongated portion 40 such that the tip 42 or an end 40a of elongated portion 40 does not vibrate or "track" or "walk" along an inner surface 34a (FIG. 3) of impeller housing 34.

Advantageously, this system provides a system and method for reducing, for example, vibration between the impeller 40 and impeller housing 34 which, in turn, reduces or prevents the elongated portion 40 and its tip 42 and associated end 40a from vibrating.

In operation, the impeller housing 34 defines a pump cavity 51 (FIG. 3) that creates a pressure to outlet 36 in order to pump the washer fluid from reservoir 22 to the nozzles 25 and, ultimately, the surface 16a of windshield 16. It should be appreciated that the nest 37 at end 40a defines inlet apertures for the pump 20 to receive fluid from reservoir 22, either directly or through line 21 (FIG. 1).

In the embodiment being described, the impeller 30 comprises a D-shaped hole 53 (FIG. 3) at end 40b which receives a complimentary D-shaped armature 28a (FIG. 2). It should be appreciated that the impeller 30 and its elongated portion 40 may move axially in the direction of double arrow B in FIG. 2 when the impeller 30 is rotated about axis A in order to provide the necessary pumping action required to pump washer fluid from inlet 32 to outlet 36.

Advantageously, when the motor 28 drives impeller 30 at about 15,000 to 25,000 RPMs, noise and vibration are reduced and pumping efficiency is increased because the bearing 44 maintains the impeller 30 in a substantially aligned position in pump cavity 51, thereby causing the impeller 30 to be aligned both axially and circumferencially relative to armature 28a. Thus, it should be appreciated that the present invention provides a system and method for improving the rotational and axial alignment of impeller 30 in order to reduce noise and vibration within the impeller housing 34. This invention also facilitates reducing or eliminating any frictional engagement between end 40a of impeller 30 and the inner surface 34a of impeller housing 34.

FIG. 4 illustrates another embodiment of the invention where like parts are labeled with the same parts numbers with the addition of a "'" added thereto. Note in FIG. 4 that the impeller housing 34 comprises an integrally molded locator 60' at an end 35' of impeller housing 34'. Notice also that impeller 30' comprises a locating aperture 62' at an end 40a' of impeller 30' which receives the locator 60' in order to achieve the axial and rotational alignment referred to earlier herein.

Figure 5:
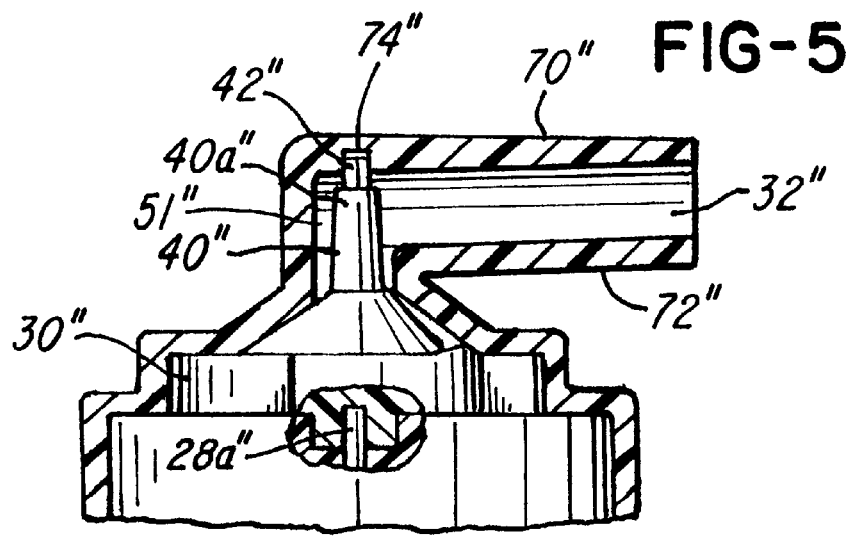
FIG. 5 is a view illustrating another embodiment of the invention.

FIG. 5 illustrates yet another embodiment with like parts being labeled with like numbers, except that the parts are labeled with a "''" marking. showing a pump having a inlet 32" which introduces washer fluid into the pump cavity 51" from a side or at an angle which is not generally co-axial with the impeller 30". In this embodiment, notice that inlet 32" is defined by a plurality of inlet walls 70" and 72". Notice in this embodiment that wall 70" comprises an aperture 74" for receiving tip 42" of impeller 30" in order to maintain the axial and rotational alignment of elongated portion 40" relative to the axis of armature 28a" and relative to inlet 32".

The method for reducing vibration of the impeller 30 in the fluid pump 20 comprises the steps of mounting the impeller 30 on armature 28a (FIG. 2) and situating the impeller 30 in the pump cavity 51 as shown. Next, the impeller housing 34 is slidably mounted over the impeller 30 and onto motor housing 26 such that the tip 42 of elongated portion 40 is received in aperture 45 of bearing 44 such that the impeller 30 may be axially and rotatably driven or moved in impeller housing 34 when driven by motor 28.

Advantageously, the system and method of the present invention allows freedom of movement in the axial direction (i.e., along the axis of armature 28a), thereby allowing the impeller 30 to operate in a substantially centered position within pump cavity 50 while being substantially aligned and supported by armature 28a. In the embodiments being described, the impeller 30 and impeller housing 34 are one-piece molded constructions molded from a plastic or polymer material whose surfaces are substantially constantly cooled and lubricated by the washer fluid 17 (FIG. 1) being pumped from inlet 32 to outlet 36.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A washer pump for use in a window washing system comprising:

a pump motor;

an impeller having a front end of a first diameter directly coupled to an armature of said pump motor and an impeller tip of a second, reduced diameter with blades extending from said front end to said impeller tip;

said impeller tip having an outer surface;

a pump motor housing for receiving said pump motor;

an impeller housing defining a pump cavity for receiving the impeller and comprising a housing end for coupling to said pump motor housing and a tip end; and said impeller housing and said impeller cooperating to maintain said impeller in a substantially centrally-located position in said pump cavity;

said impeller housing comprising an inner surface defining an aperture for receiving said impeller tip, with said inner surface and said outer surface forming a bearing therebetween.

2. The washer pump as recited in claim 1 wherein said bearing comprises a nest integrally molded in said tip end into said impeller housing to define said bearing at an inlet end of said impeller housing.

3. The washer pump as recited in claim 2 wherein said impeller nest comprises a plurality of nest legs defining a plurality of input apertures through which washer fluid to pass as well as said bearing.

4. The washer pump as recited in claim 2 wherein said impeller housing comprises an impeller end defining a locator, said impeller tip comprises an aperture for receiving said locator to cause said impeller to be situated in said substantially centrally-located position in said pump cavity.

5. The washer pump as recited in claim 4 wherein said impeller housing comprises a plurality of legs integrally molded to said bearing and said to define a plurality of input apertures through which washer fluid is pumped.

6. A windshield washing system for washing a window on a vehicle comprising:

a reservoir for storing washer fluid;

a washer pump for pumping washer fluid from said reservoir to said windshield when a washer switch is actuated to initiate a wash cycle;

said washer pump comprising:

a pump motor;

an impeller having an impeller tip and an end for direct coupling to an armature of said pump motor, said impeller tip having an outer surface defining a diameter which is smaller than a diameter of said end, said impeller further comprising a plurality of blades extending from said end to said tip end;

a pump motor housing for receiving said pump motor; and an impeller housing defining a pump cavity for receiving the impeller and comprising a housing end for coupling to said pump motor housing and a housing tip end for receiving said impeller tip;

said impeller housing comprising an inner surface defining an aperture for receiving said impeller tip, with said inner surface providing a bearing for said outer surface to facilitate maintaining said impeller in said centrally-located position in said pump cavity.

7. The windshield washing system as recited in claim 6 wherein said bearing comprises a nest integrally molded with said impeller housing to define said bearing at an inlet end of said impeller housing.

8. The windshield washing system as recited in claim 7 wherein said impeller nest comprises a plurality of nest legs defining a plurality of input apertures through which washer fluid and said bearing.

9. The windshield washing system as recited in claim 6 wherein said impeller housing comprises an impeller end defining a locator, said impeller tip comprises an aperture for receiving said locator to cause said impeller to be situated in said substantially centrally-located position in said pump cavity.

10. The windshield washing system as recited in claim 9 wherein said impeller end defines a plurality of input apertures.

11. A method for reducing vibration of an impeller in an elongated impeller housing having an inner surface defining an aperture of a windshield washer fluid pump; said impeller housing defining a pump cavity for receiving the impeller, said impeller being directly coupled to a motor, said method comprising the steps of:

providing an impeller having a tip having a first diameter and a housing end having a second diameter and blades extending therebetween, said first diameter being smaller than said second diameter and said tip having an outer surface;

situating the impeller in said pump cavity;

centrally locating said impeller in said pump cavity defined by said impeller housing such that said outer surface of said impeller is received in said aperture, with said inner surface providing a bearing therefor, said impeller being maintained in a predetermined position in said pump cavity so that said portion of said impeller does not vibrate when said impeller is either axially or rotatably driven; and driving said impeller in said pump cavity to pump washer fluid from a reservoir to a windshield said method further comprises the step of:

situating an end of said impeller in a bearing formed in said impeller housing.

12. The method as recited in claim 11 wherein an end of said impeller is generally elongated, said method further comprises the step of:

situating a tip of said impeller in a bearing defined by said impeller housing such that said end of said impeller does not vibrate.

13. The method as recited in claim 11 wherein said impeller housing comprises an impeller end defining an impeller nest defining at least one aperture for receiving an end of said impeller, said method further comprising the step of:

situating an end of said impeller in said aperture to cause said impeller to become aligned in said pump cavity.

14. The method as recited in claim 11 wherein said impeller comprises an end having an aperture therein, said impeller housing comprising a locator integrally molded therein; said method further comprising the step of:

guiding said impeller into said pump cavity such that said impeller locator becomes situated in said aperture so that the impeller becomes aligned therein so that said impeller can be axially and rotatably driven in said pump cavity.

15. A washer pump for use in a window washing system comprising:

a pump motor;

an impeller directly coupled to an armature of said pump motor, said impeller being elongated and comprising at least one blade extending from a housing end of said impeller to an impeller tip end;

said impeller tip end having a diameter which is smaller than a diameter of said housing end, said impeller tip end further comprising an outer surface;

a pump motor housing for receiving said pump motor;

an impeller housing having an inner surface defining an aperture defining a pump cavity for receiving the impeller, said impeller housing comprising a housing end for coupling to said pump motor housing and a housing tip end; and locator means for locating said impeller in said pump cavity such that said impeller is maintained in a substantially centrally-located position in said pump cavity;

said impeller tip end being received in said aperture and said inner and outer surfaces defining a bearing therebetween for receiving said impeller tip end to facilitate maintaining said impeller in said centrally-located position in said pump cavity.

16. The washer pump as recited in claim 15 wherein said bearing comprises a nest integrally molded into said impeller housing at said tip end to define said bearing at an inlet end of said impeller housing.

17. The washer pump as recited in claim 16 wherein said impeller nest comprises a plurality of nest legs defining a plurality of input apertures through which washer fluid passes as well as said bearing.

18. The washer pump as recited in claim 15 wherein said locator means comprises a locator situated on said impeller housing at said tip end and an impeller tip comprising an aperture for receiving said locator to cause said impeller to be situated in said substantially centrally-located position in said pump cavity.

19. The washer pump as recited in claim 18 wherein said impeller comprises an impeller end comprising a plurality of legs defining a plurality of input apertures.

* * * * *